US008650501B2

(12) United States Patent
Arnold et al.

(10) Patent No.: US 8,650,501 B2
(45) Date of Patent: Feb. 11, 2014

(54) USER INTERFACE WITH PREVIEW TRANSITIONS

(75) Inventors: Jeff Arnold, Sammamish, WA (US); Jeffrey Cheng-Yao Fong, Seattle, WA (US); Pritesh Bodalia, Bellevue, WA (US); Jeffrey L. Bogdan, Redmond, WA (US); Lee Dicks Clark, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 12/721,420

(22) Filed: Mar. 10, 2010

(65) Prior Publication Data

US 2011/0225543 A1 Sep. 15, 2011

(51) Int. Cl.
*G06F 3/048* (2013.01)

(52) U.S. Cl.
USPC .......... 715/772

(58) Field of Classification Search
USPC .......... 715/772, 864
See application file for complete search history.

(56) References Cited

U.S. PATENT DOCUMENTS 5,627,960 A 5/1997 Clifford
5,859,639 A 1/1999 Ebrahim
2002/0097264 A1* 7/2002 Dutta et al. .......... 345/745
2003/0025676 A1 2/2003 Cappendijk
2009/0178008 A1 7/2009 Herz
2010/0115459 A1* 5/2010 Kinnunen et al. .......... 715/785
2012/0084711 A1* 4/2012 Duarte et al. .......... 715/783

FOREIGN PATENT DOCUMENTS

WO WO 2009023591 A2 2/2009

OTHER PUBLICATIONS

"Format Menu," *FrontPage*, vol. 5, Issue 10, Oct. 1999, 2 pages.
"New GlobeBerry 2 theme for the Storm!" downloaded on Jan. 7, 2010, 6 pages.
Spillers, "Progressive Disclosure," Interaction-Design.org, downloaded on Jan. 7, 2010, 5 pages.

* cited by examiner

*Primary Examiner* — Thanh Vu
(74) *Attorney, Agent, or Firm* — Aaron Chatterjee; Andrew Sanders; Micky Minhas

(57) ABSTRACT

A user interface is described that temporarily displays portions of a page that reside outside of the viewable area of the screen. An animated transition creates a brief preview of at least one user interface feature. Additionally, the user interface feature is then animated out of the viewable area in a way to suggest a location of the feature. In one embodiment, a target page that is being opened controls the transition and animates features into and out of the viewable area to create the temporary preview. In another embodiment, the target page includes user interface elements that can asynchronously control the preview animation independent from the main content of the target page. In yet another embodiment, a transition coordinator can coordinate the timing between animating out a foreground application while animating in a target application.

20 Claims, 11 Drawing Sheets

VIEWABLE AREA OF GUI
500
EXPOSED PORTION OF PAGE 602
UI FEATURE
518
UI FEATURE
520
UNEXPOSED PORTION OF PAGE OUTSIDE OF VIEWABLE AREA 604

RECEIVE USER INPUT TO OPEN A TARGET PAGE
200
ANIMATE TRANSITION TO DISPLAY TARGET PAGE
202
DURING TRANSITION, TEMPORARILY DISPLAY UI FEATURES INCLUDING CONTENT TO INDICATE TO THE USER THE UI FEATURES AVAILABLE AND LOCATION
204
AUTOMATICALLY REMOVE THE TEMPORARY DISPLAYED FEATURES FROM THE VIEWABLE AREA
206

400

DESTINATION APPLICATION
PAGE
408
412
414
UI ELEMENT
UI ELEMENT
Animation Library
410
406
404
TRANSITION COORDINATOR
402
TRANSITION DATA
401
FOREGROUND APPLICATION VIEWABLE AREA
OF GUI 504
500
UI
FEATURE
UI
FEATURE
UI
FEATURE
518
506
UI
FEATURE
UI
FEATURE
UI
FEATURE
520
522
502
OUTSIDE VIEWABLE
AREA VIEWABLE AREA OF GUI
500
EXPOSED PORTION OF PAGE 602
UI FEATURE
518
UI FEATURE
520
UNEXPOSED PORTION OF PAGE OUTSIDE OF VIEWABLE AREA 604

1100
CLOUD
1110
SERVICE PROVIDERS
1120
COMPUTER SCREEN WITH PREVIEW TRANSITIONS
1130
MOBILE DEVICE SCREEN WITH PREVIEW TRANSITIONS
1131
TELEVISION SCREEN WITH PREVIEW TRANSITIONS
1132

USER INTERFACE WITH PREVIEW TRANSITIONS

TECHNICAL FIELD

The present application relates to user interfaces, and, particularly to transitions used in a user interface, such as when a new page is displayed.

BACKGROUND

With the increasing popularity of mobile devices, including cellphone devices, handheld devices, handheld computers, smartphones, PDAs, etc., there is a need for improving the user interface experience by increasing user input entry speed, reducing entry errors, and improving the overall user experience.

Mobile devices with capacitive or resistive touch capabilities are well known. Modern mobile phones have evolved over recent years to the point where they now possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run web browser, navigation system, media player and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves.

Additionally, the content of a page to be displayed typically is much larger than the display area itself. As a result, a portion of the content is on the display and the remaining portion is outside the viewing area (i.e., hidden from view) so that the user must scroll to see all of the content. Typically, scrolling is achieved through a flick operation where the user's finger is dragged across the display so as to scroll the previously hidden portions into view. As the additional content is hidden, the user does not know whether to flick left, right, up or down to view the remainder of the content. Thus, the hidden content becomes problematic as the user might have to experiment and search for it, which contradicts the goal of making the user interface a "friendly" environment.

SUMMARY

A user interface is described that temporarily displays portions of a page that reside outside of the viewable area of the screen. An animated transition creates a brief preview of at least one user interface feature. The user interface feature is then animated out of the viewable area in a way to suggest a location of the feature.

In one embodiment, a target page that is being opened controls the transition and animates features into and out of the viewable area to create the temporary preview.

In another embodiment, the target page includes user interface elements that can asynchronously control the preview animation independent from the main content of the target page.

In yet another embodiment, a transition coordinator can coordinate the timing between animating out a foreground application while animating in a target application.

The foregoing and other objects, features, and advantages of the invention will become more apparent from the following detailed description, which proceeds with reference to the accompanying figures.

DETAILED DESCRIPTION

Figure 1:
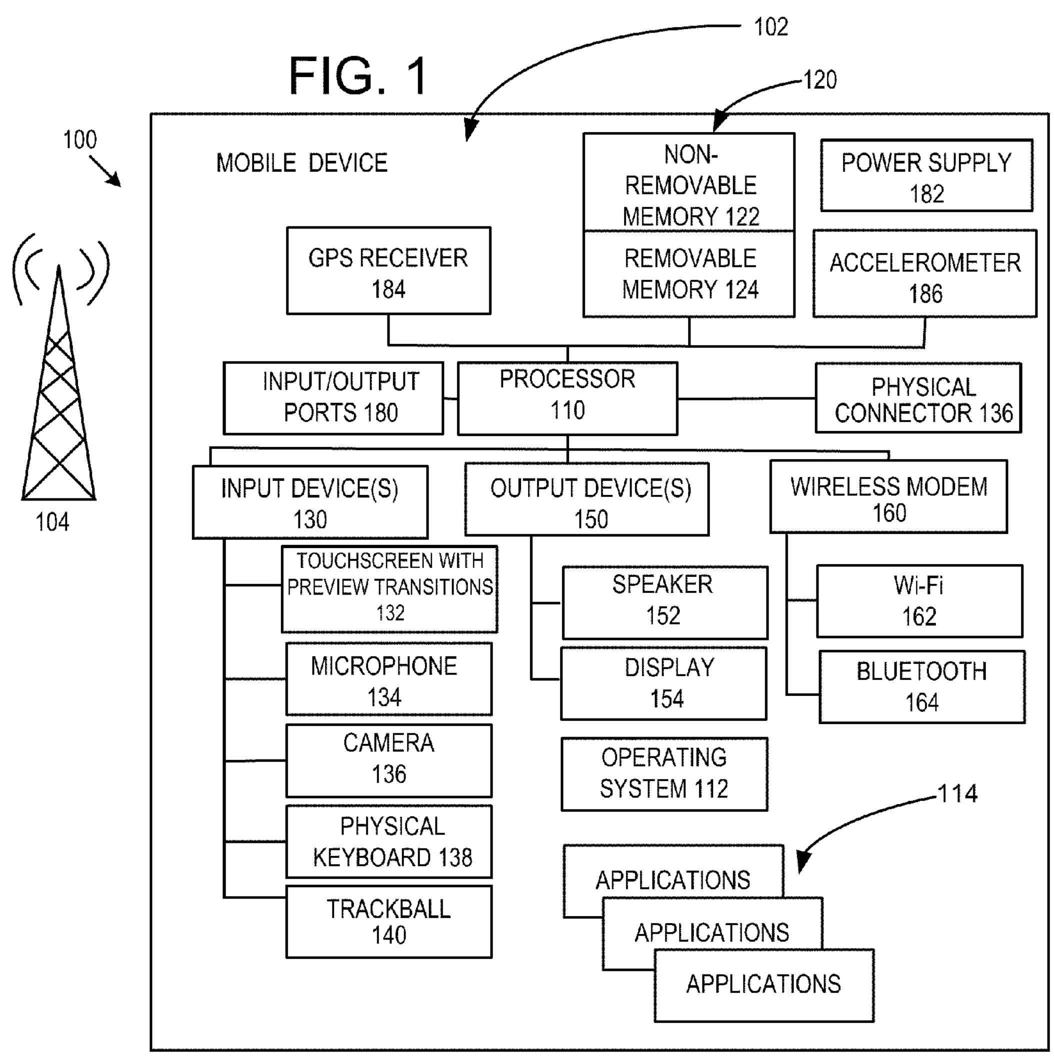
FIG. 1 is mobile device having a touch screen configured to display preview transitions when opening a target page.

FIG. 1 is an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, handheld computer, Personal Digital Assistant (PDA), etc.) and can allow wireless two-way communications with one or more mobile communications networks 104, such as a cellular or satellite network. The illustrated mobile device can include a controller or processor 110 (e.g., signal processor, microprocessor, ASIC, or other control and processing logic circuitry) for performing such tasks as signal coding, data processing, input/output processing, power control, and/or other functions necessary for implementing the mobile device. An operating system 112 can control the allocation and usage of the components 102 and support for one or more application programs 114. The application programs typically include email applications, calendars, contact managers, web browsers, text and media messaging applications. Memory 120 can include non-removable memory 122 and/or removable memory 124. The non-removable memory 122 can include RAM, ROM, flash memory, a hard disk, or other well-known memory storage technologies and can be used for storing data and/or code for running the operating system 112 and the applications 114. Example data can include web pages, text, images, sound files, video data, or other data sets to and from one or more network servers or other mobile devices via one or more wired or wireless networks. The removable memory 124 can include flash memory or a Subscriber Identity Module (SIM) card, which is well known in GSM communication systems, or other well-known memory storage technologies, such as "smart cards." The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device can support one or more input devices 130, such as a touch screen 132, microphone 134, camera 136, physical keyboard 138 and/or trackball 140 and one or more output devices 150, such as a speaker 152 and a display 154. The touch screen 132 can provide preview transitions as described herein. Other possible output devices (not shown) can include piezoelectric or other haptic output devices. A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSSTN). The mobile device can further include at least one input/output port 180, a power supply 182, a satellite navigation system receiver 184, such as a Global Positioning System (GPS) receiver, an accelerometer 186, a transceiver 188 (for wirelessly transmitting analog or digital signals) and/or a physical connector 190, which can be a USB port, IEEE 1394 (firewall) port, and RS-232 port. The illustrated components 102 are not required or all-inclusive, as any components can deleted and other components can be added.

As described above, the touch screen 132 allows for transitions between pages being displayed. The transitions allow a user to visualize which user interface features are available on a page and where they are located. Such information is displayed to the user in an animated fashion while the page is opening.

Figure 2:
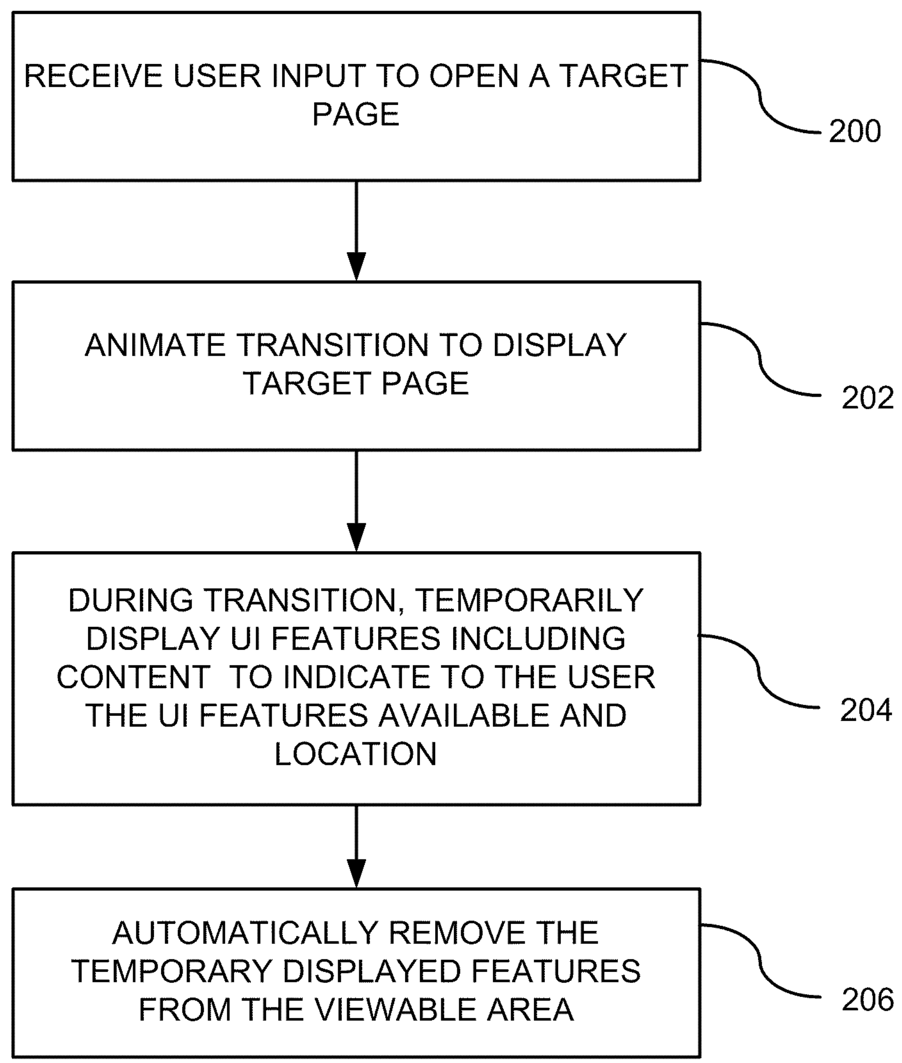
FIG. 2 is a flowchart of a method for previewing user interface features when opening a target page.

FIG. 2 is a flowchart of a method for transitioning to a target page. In process block 200, user input is received to open a target page. In process block 202, a transition is animated to display the target page. The target page can be associated with an application that is starting up or the target page can be associated with a transition between pages within an application. In process block 204, as the transition is occurring, user interface features of the target page are temporarily displayed to preview the features to the user. The user interface features can be any type of content including toolbars, check boxes, text, images, etc. In process block 206, the user interface features are removed from the viewable area so as to complete the preview. In one embodiment, removing the features includes animating the features out of the viewable area in a direction so as to indicate a location of the features outside of the viewable area.

Figure 3:
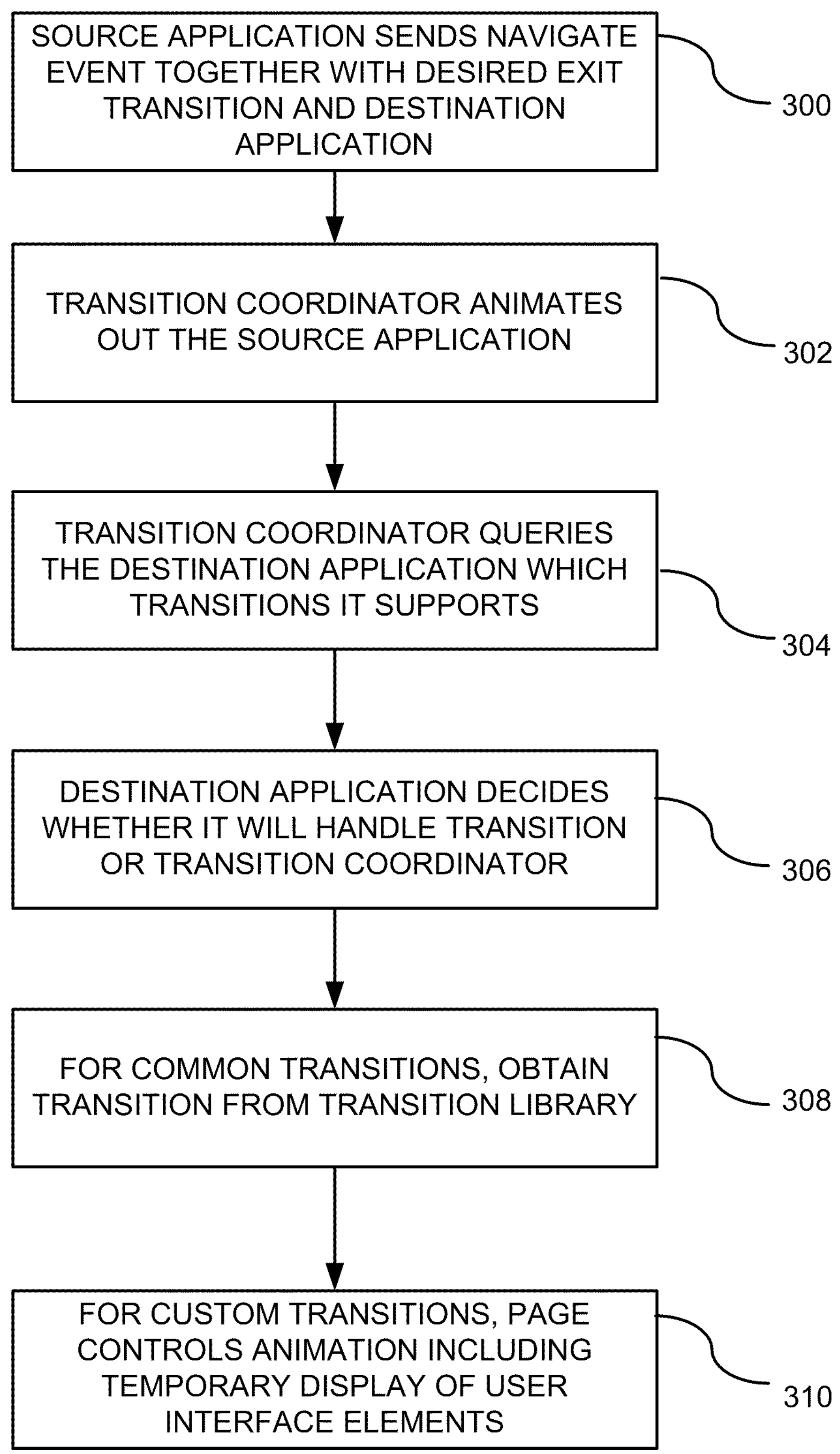
FIG. 3 is a more detailed flowchart of a method for previewing user interface features.

FIG. 3 is a flowchart of a method for a particular embodiment wherein a source application animates out of a user interface and a target application animates into a user interface. In process block 300, a source application sends a navigate event together with a desired exit transition and information about the destination application. A transition coordinator can receive the navigation event and animate out the source application in the requested manner (process block 302). If the source application does not provide a desired exit transition, then a system transition can be used. In process block 304, the transition coordinator can query the destination application which transitions it supports and whether it wants to use the system transition. In process block 306, the destination application can decide whether it will handle the transition or let the transition coordinator handle it. In particular, the destination application can respond to the query of the transition coordinator and either instruct the transition coordinator to handle the transition or decide to handle the transition itself. In process block 308, if the transition is a common system transition, the page (which is being opened) associated with the destination application accesses an animation library, which has information to define the overall motion behavior of the entire page or full layout of the scene. In process block 310, for custom transitions, the page being opened controls the animation including the temporary preview display of the user interface elements. For example, each page can contain child user interface elements (e.g., common controls, such as checkboxes or list view items) and the child user interface elements can monitor for the type of transition that will occur for the page. If the child user interface element has specific behavior defined for a transition, they can animate this behavior asynchronously from the rest of the page's contents. If they do not have specific behavior defined, they can allow the user interface elements to animate in with the rest of the page.

Figure 4:
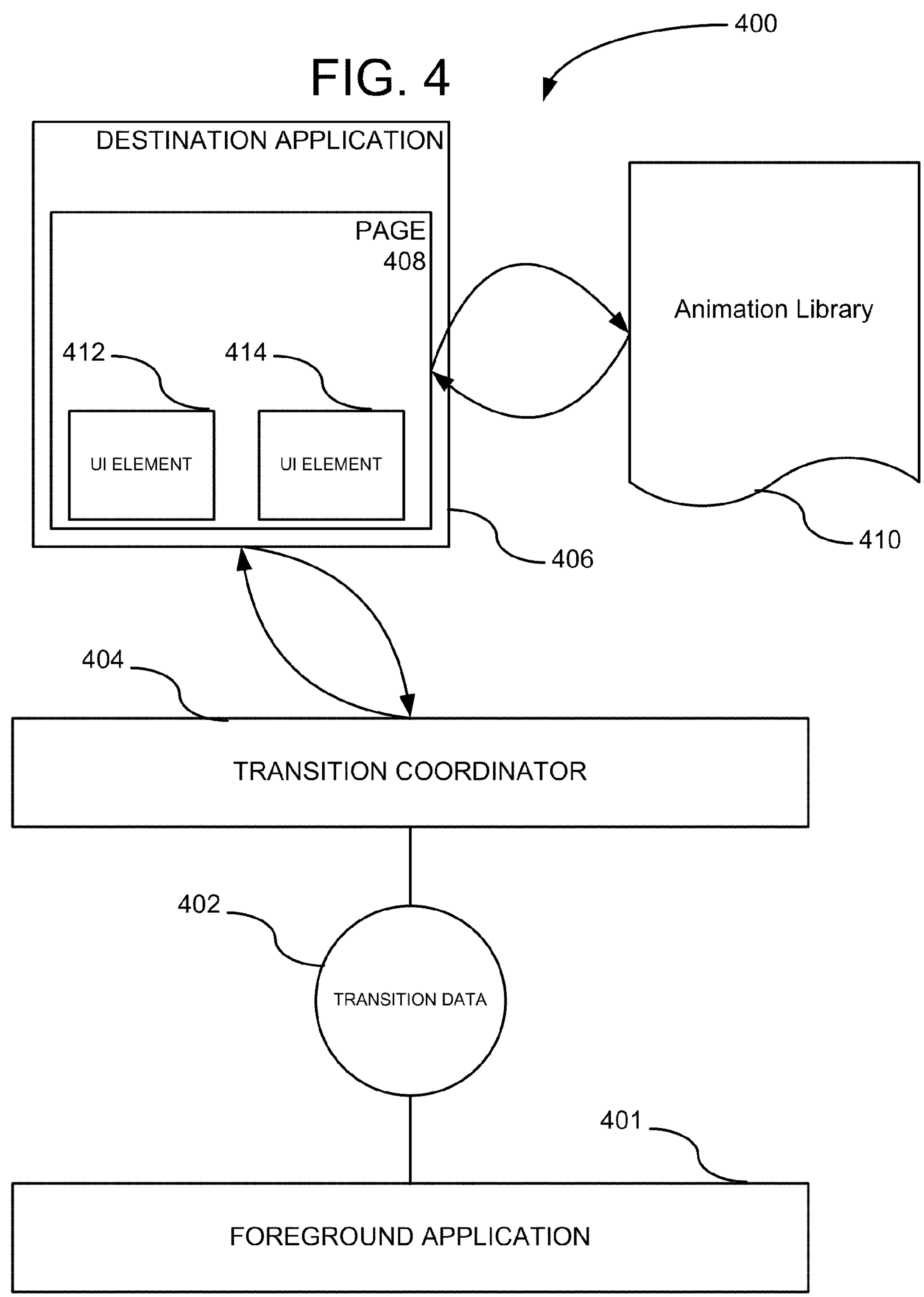
FIG. 4 is an embodiment of a system for previewing user interface features.

FIG. 4 shows an embodiment of the overall system structure 400 that can be used to implement the preview transitions. A foreground application is shown at 401. In this particular embodiment, the foreground application is executing and receives user input to open a target application. In response, the foreground application fires a navigation event and sends transition data 402 to a transition coordinator 404. The transition data can include the desired transition out of the foreground application and information relating to the target application to be opened. The transition coordinator 404 organizes the transition out of the foreground application and the transition in of the target application. The transition coordinator 404 communicates with the destination application 406 and queries whether the transition coordinator is handling the transitions or whether the application will animate at the page level. In any event, the transition coordinator can pass off the transition information to a first page 408 in the application. In the case of a common transition, the page 408 accesses an animation library 410 that has a plurality of motion behaviors that can be used for transitions. The page 408 is a base layout element that can host child elements, such as child elements 412, 414. Although two child elements are shown, a page can include any desired number of child elements. Example child elements include controls, such as checkboxes and list view items.

Figure 5:
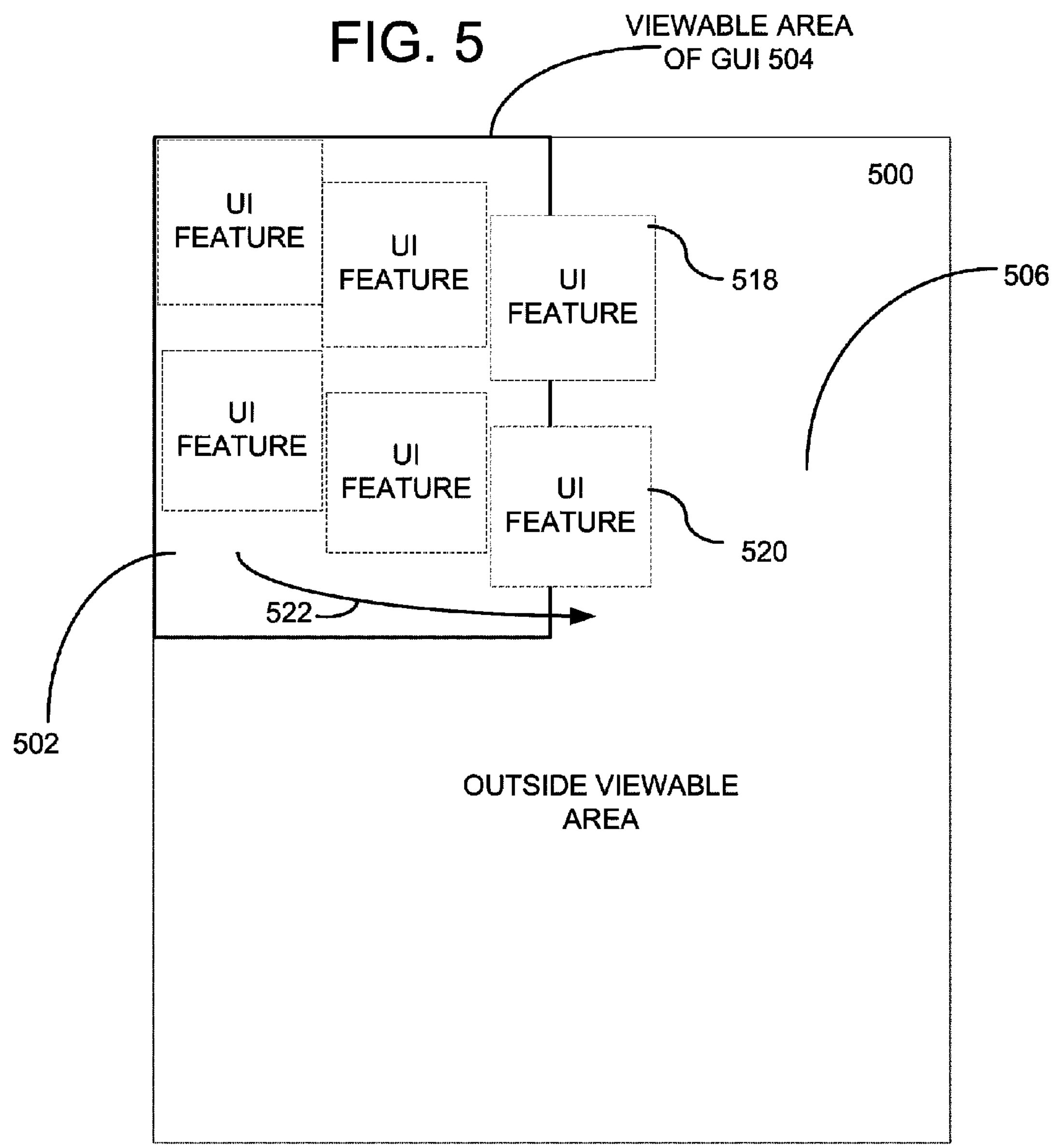
FIG. 5 shows a transition of user interface features moving from a viewable area to outside of the viewable area.

FIG. 5 shows an example of how a preview transition can occur. A page 500 is shown as having a portion 502 within a viewable area 504 of a graphical user interface and a portion 506 outside of the viewable area. Generally, the page 500 is too large to fit within the viewable area 504, so the user must navigate, such as through a flick operation, to view the other content. The flick operation is well-known in the industry and includes allowing the user to drag a finger across the viewable area 504 in order to move content from outside the viewable area 506 into the viewable area 504. Two user interface features 518 and 520 are shown as being animated in a transition phase of opening the page 500. The user interface features 518 and 520 are shown in dashed lines to indicate that they are moving across the viewable area 504 in the direction of arrow 522. As such, the transition temporarily shows the user interface features to preview the features to the user. Additionally, as the features move off the viewable area of the page 504, the user has an understanding what user interface features are available and their location when they reside outside of the viewable area.

Figure 6:
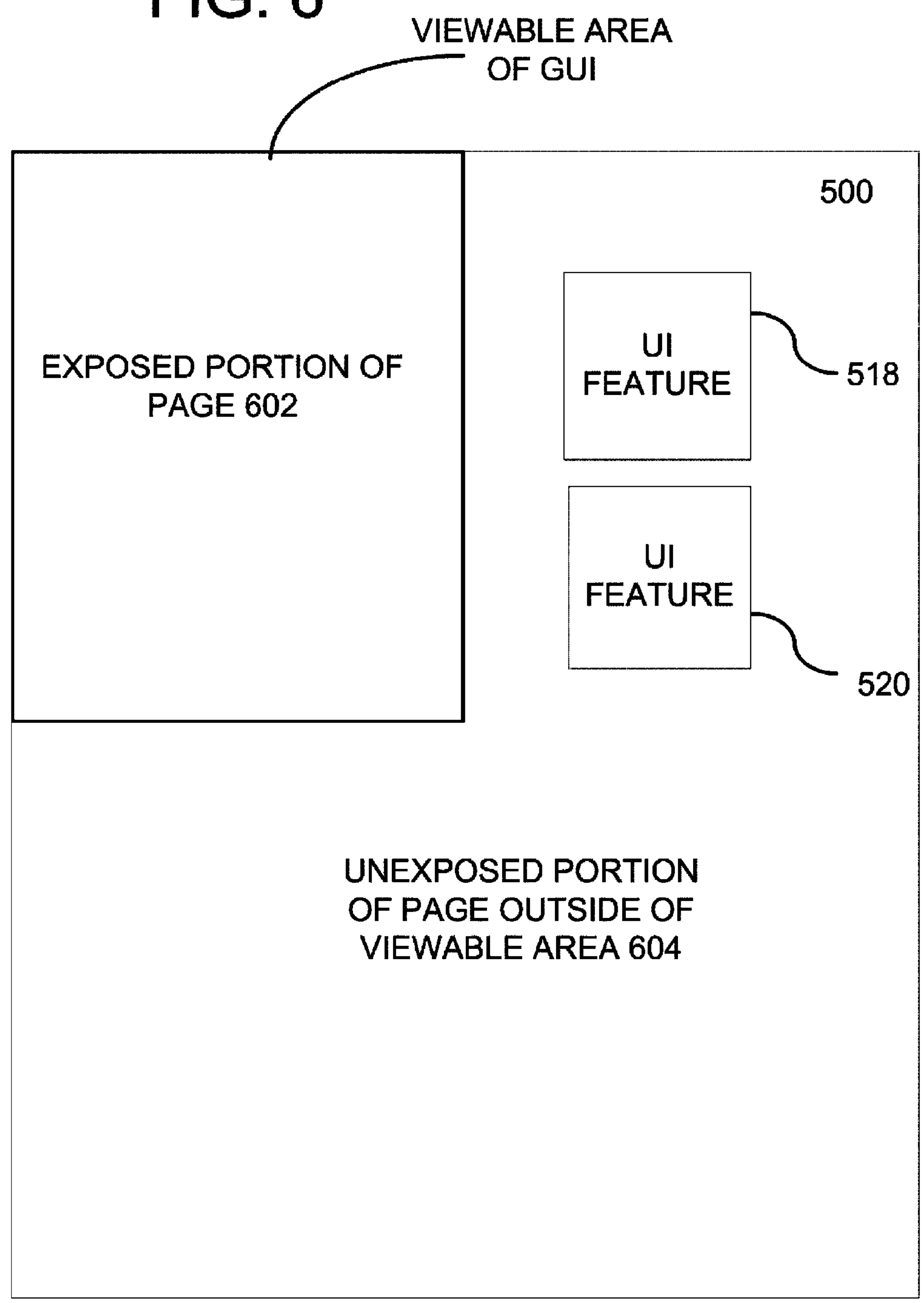
FIG. 6 shows the page of FIG. 5 after the transition has completed and the page is opened.

FIG. 6 shows the page 500 after it has opened (i.e., transition completed), with the user interface features 518 and 520 in a static, at-rest state. The exposed portion of the page 602 is visible to the user and the unexposed portion 604 is only available through additional user input. Even with the user interface features 518 and 520 in the unexposed portion of the user interface, due to the preview transition of FIG. 5, the user can know which user interface features are available and the direction the page must be moved to access those user interface features. Thus, the preview transition provided the user with what user interface features are available and where they are located.

Figure 7:
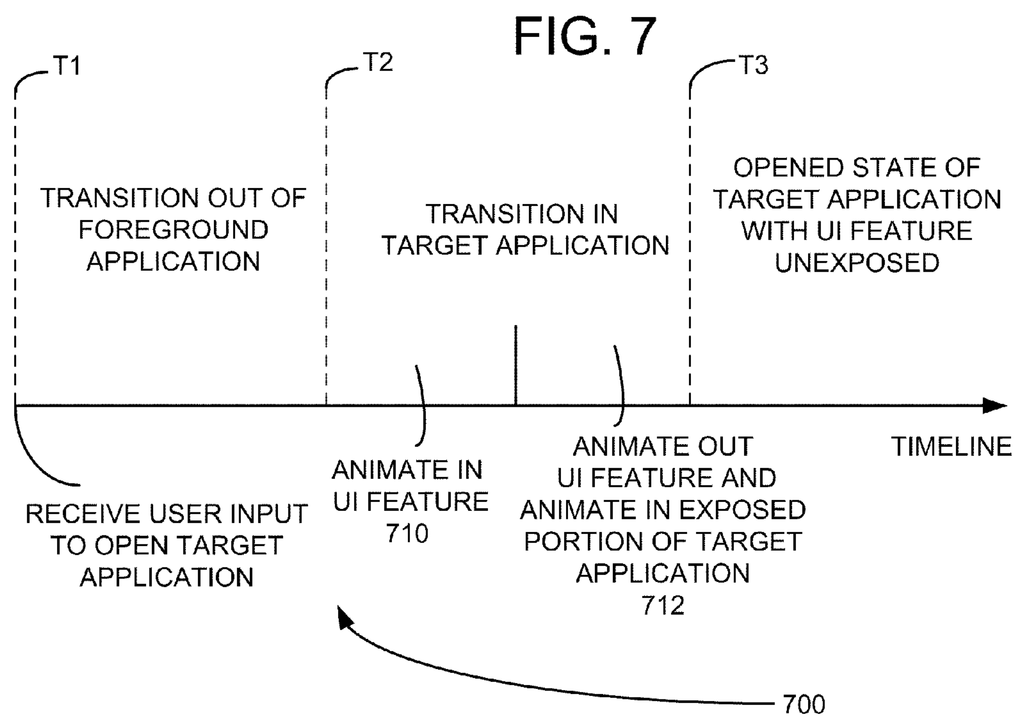
FIG. 7 shows a timeline of transitions moving from a foreground application to a target application.

FIG. 7 shows an example timeline 700 with a foreground application transitioning out and a target application transitioning into the user interface. At time T1, a request is received from the foreground application to transition out of the user interface. Between time T1 and T2, the foreground application transitions out as controlled by a transition coordinator. Between times T2 and T3, the target application transitions into the user interface. For a first part of this time period 710, a user interface feature is animated into the viewable area and for a second part of this time period, the user interface feature animates out of the viewable area. Such transitions can occur according to the particular application and can easily be modified. After a time period T3, the target application is in the opened state and the transition is completed.

Figure 8:
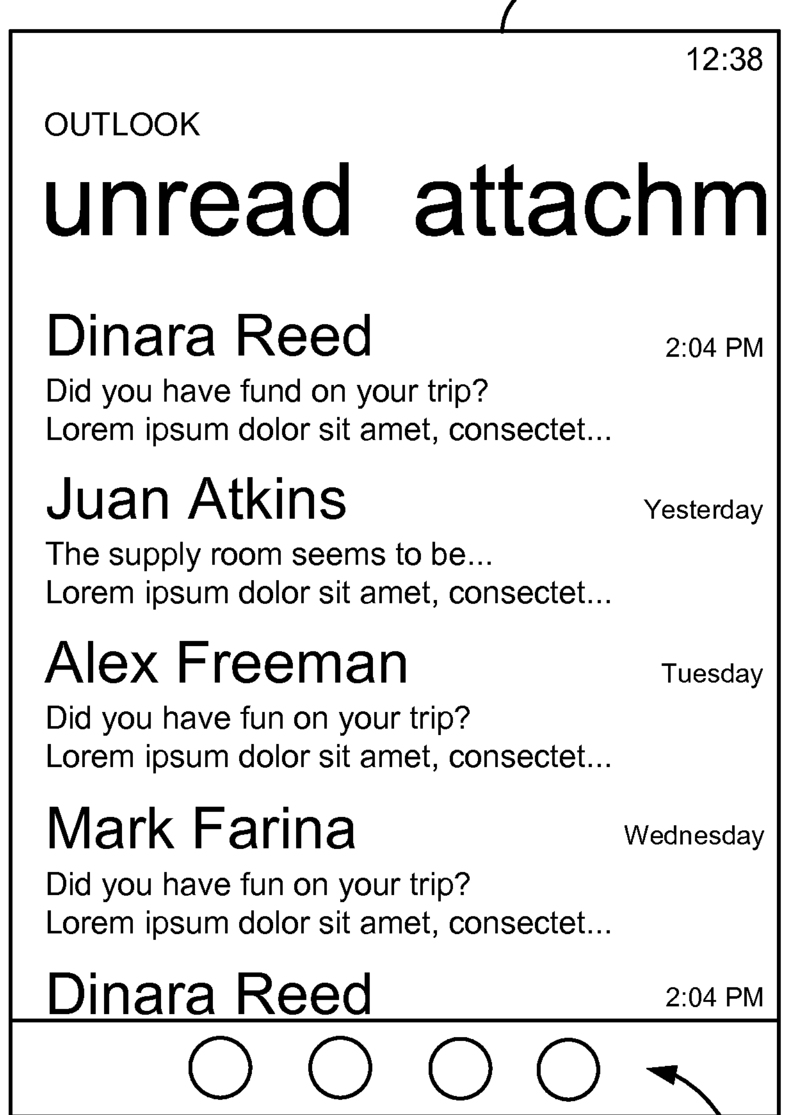
FIG. 8 illustrates an example email list being displayed by an application.
Figure 9:
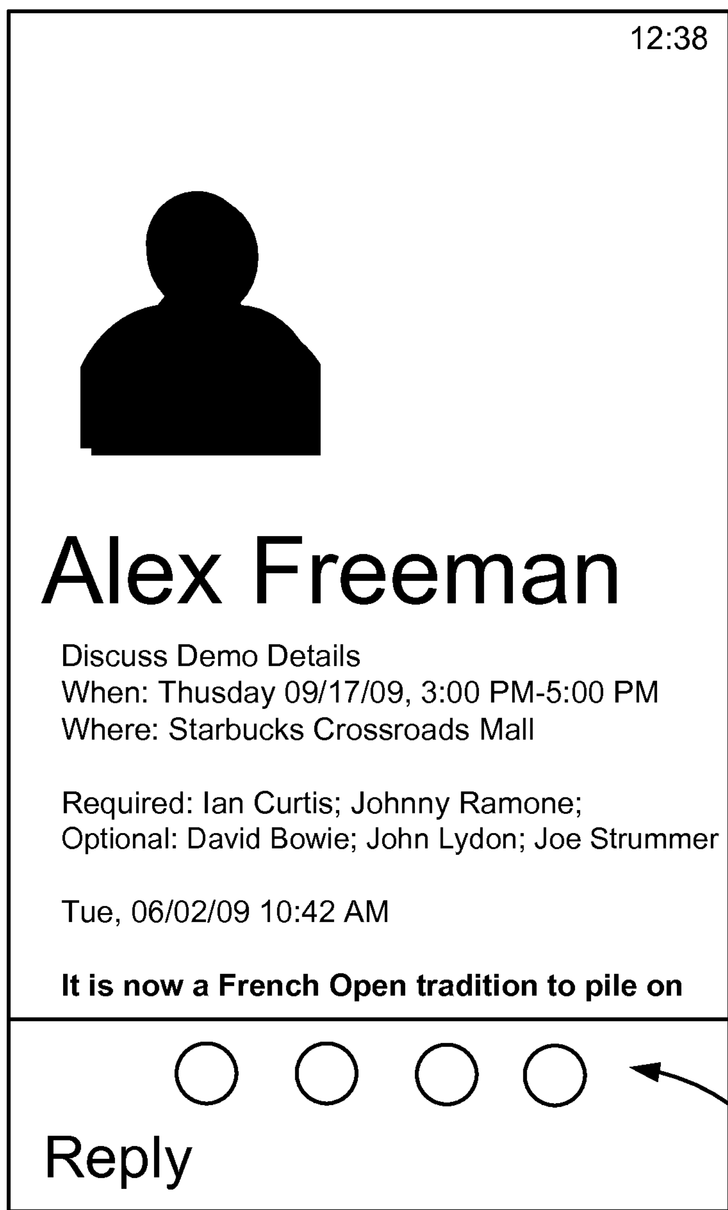
FIG. 9 illustrates a transition that occurs after a selection from the email list of FIG. 8.
Figure 10:
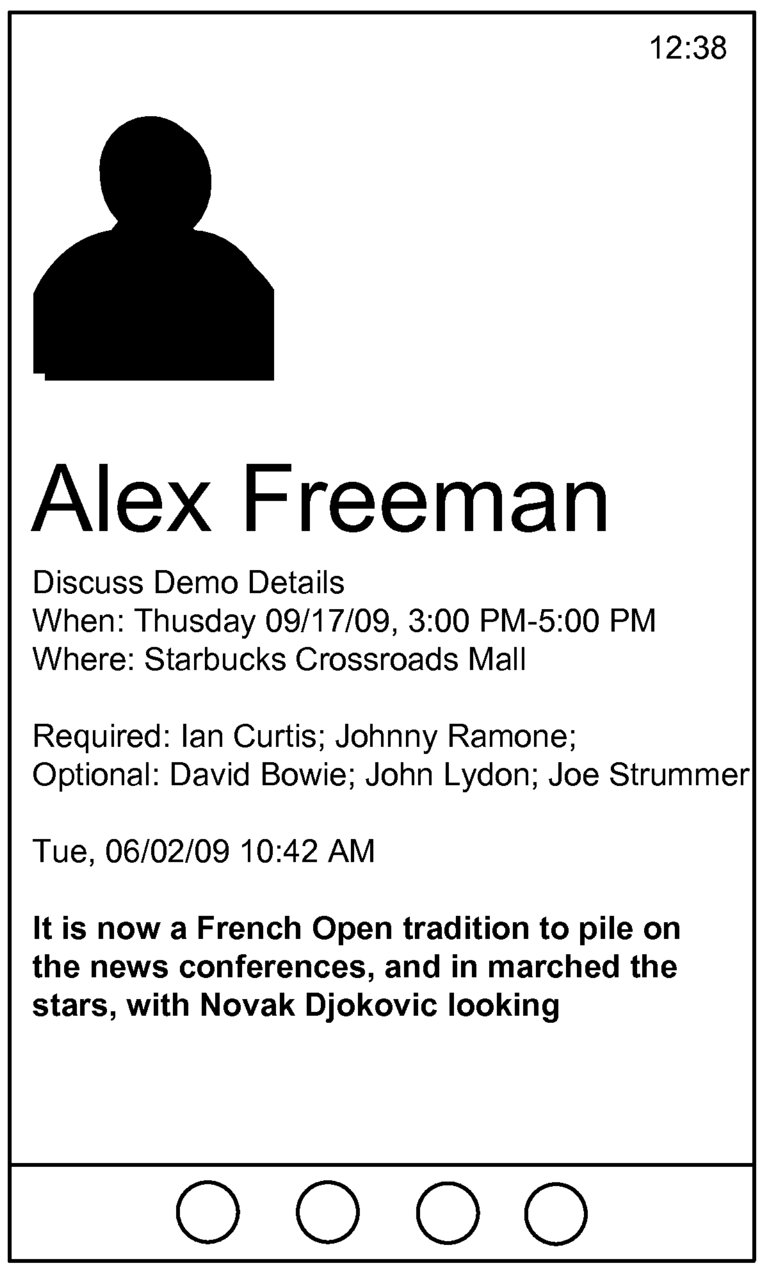
FIG. 10 illustrates the page of FIG. 9 after the transition has completed.

FIGS. 8 through 10 show a transition using an email application that opens an email from a list. First, in FIG. 8, an email list is displayed in the user interface 800. A toolbar 802 is shown at the bottom of the list. A user selects the list member entitled "Alex Freeman," which results in opening an email. When the email is opened, a transition is illustrated in FIG. 9, wherein the word "Reply" is temporarily displayed at the bottom to show the user that if they want to reply, a command is available. Additionally, the location of the Reply command is below the toolbar 802. In FIG. 10, the word "Reply" scrolls off the bottom of the screen to indicate a direction for the user to navigate in order to view the "Reply" command again. Thus, the temporary preview can also be used for transitions within an application, such as when a user selection causes new content to be displayed.

Figure 11:
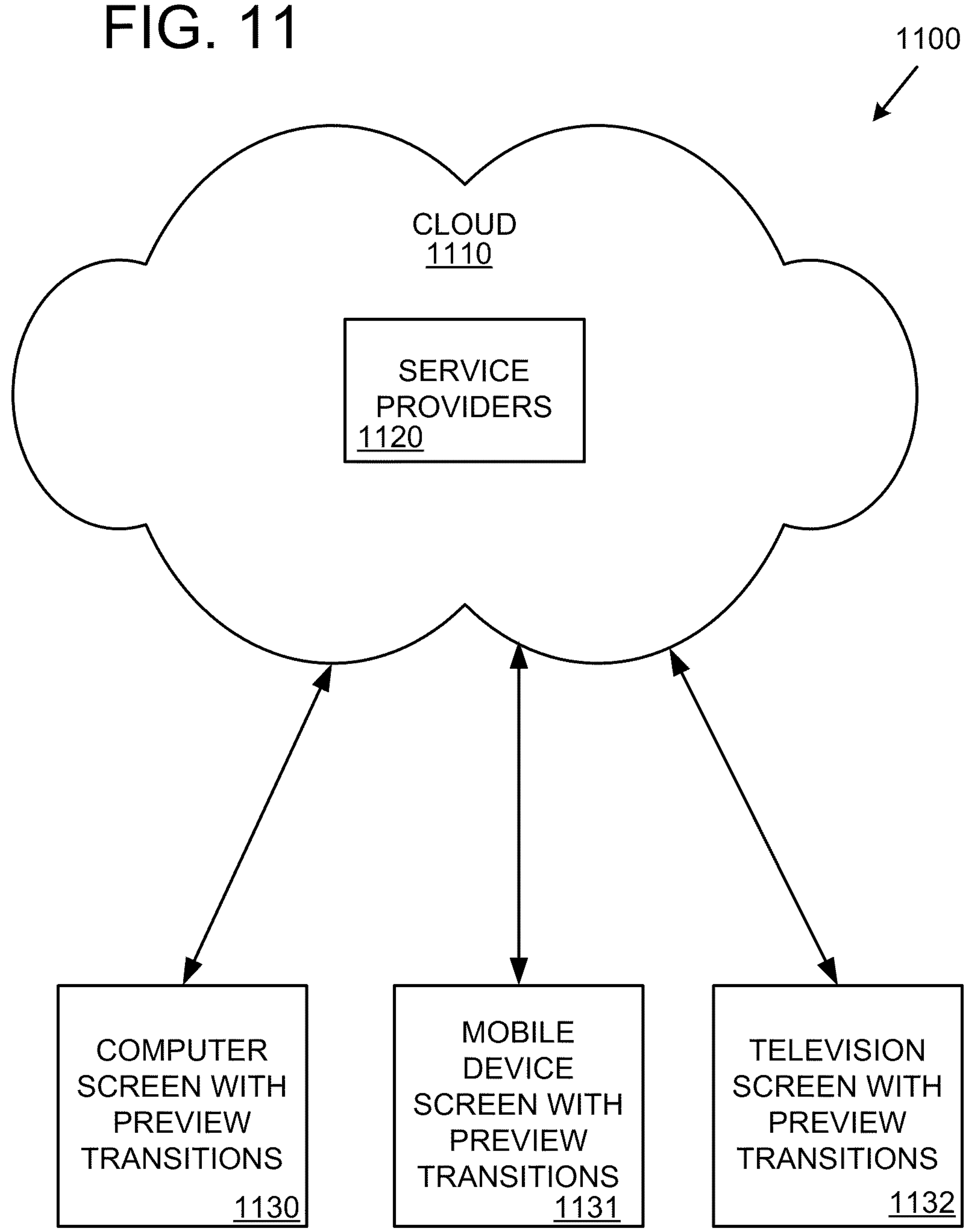
FIG. 11 shows an environment in which any of the devices can be used with the preview transitions described herein.

FIG. 11 illustrates a generalized example of a suitable implementation environment 1100 in which described embodiments, techniques, and technologies may be implemented.

In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet.

In example environment 1100, the cloud 1110 provides services for connected devices 1130-1132 with a variety of screen capabilities. Connected device 1130 represents a device with a computer screen (e.g., a mid-size screen). For example, connected device 1130 could be a personal computer such as desktop computer, laptop, notebook, netbook, or the like. Connected device 1131 represents a device with a mobile device screen (e.g., a small size screen). For example, connected device 1131 could be a mobile phone, smart phone, personal digital assistant, tablet computer, and the like. Connected device 1132 represents a device with a large screen. For example, connected device 1132 could be a television screen (e.g., a smart television) or another device connected to a television (e.g., a set-top box or gaming console) or the like. One or more of the connected devices 1130-1132 can include touch screen capabilities. Additionally, each of the devices can use the transitions described herein.

Services can be provided by the cloud 1110 through service providers 1120, or through other providers of online services (not depicted). For example, cloud services can be customized to the screen size, display capability, and/or touch screen capability of a particular connected device (e.g., connected devices 1130-1132).

In example environment 1100, the cloud 1110 provides the technologies and solutions described herein to the various connected devices 1130-1132 using, at least in part, the service providers 1120. For example, the service providers 1120 can provide a centralized solution for various cloud-based services (e.g., spelling data, grammar data, word frequency data, etc.). The service providers 1120 can manage service subscriptions for users and/or devices (e.g., for the connected devices 1130-1132 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for displaying a page in a graphical user interface of a computing device, comprising:

receiving user input to open a target page on a display, wherein the target page includes an exposed portion and an unexposed portion, the exposed portion being displayed in a viewable area of the graphical user interface when the target page is in an opened state and the unexposed portion being outside of the viewable area;

animating a transition to the target page so that a feature of the unexposed portion is temporarily displayed in the viewable area to preview the feature to the user;

automatically removing the temporarily displayed feature from the viewable area during the transition; and displaying the exposed portion of the target page in an opened state.

2. The method of claim 1, further including moving the feature into the viewable area in response to user input.

3. The method of claim 1, wherein the feature includes content.

4. The method of claim 1, wherein the animating indicates a direction for a user to move within the target page to view the feature.

5. The method of claim 1, further including animating out a source page prior to animating in the target page.

6. The method of claim 5, wherein the source page is associated with a foreground application and the target page is associated with a destination application.

7. The method of claim 1, wherein the feature includes an animation control used for animating the feature asynchronously from a remainder of the page.

8. The method of claim 1, wherein the target page is associated with a destination application and the method further includes querying the destination application whether a transition coordinator will control the animation or the destination application will control the animation.

9. The method of claim 1, further including obtaining motion behavior associated with the animation from an animation library.

10. The method of claim 1, further including passing transition information from a transition coordinator to the target page.

11. An apparatus for displaying a page in a graphical user interface, comprising:

a transition coordinator for coordinating transitions that occur when a target page is opened in the graphical user interface, the transition coordinator for querying a destination application associated with the target page as to whether the destination application is handling a transition to display the target page or whether a system animation will be used to display the target page; and the graphical user interface for displaying one or more user interface elements associated with the target page, the one or more user interface elements having controls for their animation as the target page is being opened, the controls for temporarily displaying user interface features as the target page is opened so as to indicate their location outside of a viewable area of the graphical user interface.

12. The apparatus of claim 11, further including an animation library coupled to the target page for defining motion behavior for the page as it is being opened.

13. The apparatus of claim 11, wherein the apparatus is a mobile phone.

14. The apparatus of claim 11, wherein the user interface features include a toolbar or a checkbox.

15. A computer-readable storage having instructions thereon for implementing a method of displaying a page, the method comprising:

receiving a navigation event and target application information from a foreground application;

animating out the foreground application;

requesting the target application whether the target application is handling a transition to display a first page or whether a system animation will be used to display the first page;

if a system animation is used, obtaining transition information from an animation library in order to display the first page;

if the target application is handling the transition, then using animation information provided by the target application in order to temporarily animate in a user interface feature and animate the user interface feature off of a visible display so as to indicate a location of the user interface feature on the first page.

16. The method of claim 15, wherein the user interface feature includes a checkbox or a toolbar.

17. The method of claim 15, wherein the first page has a portion within the visible display and a portion outside of the visible display and the user interface feature resides outside of the visible display upon opening the target application.

18. The method of claim 17, furthering including receiving flick input and moving the user interface feature into the visible display.

19. The method of claim 17, wherein the first page uses a first animation and the user interface feature uses a second animation that is asynchronous from the first animation.

20. The method of claim 17, wherein a transition coordinator is used to control motion behavior of animating out the foreground application.

* * * * *